United States Patent [19]

Tu et al.

[11] Patent Number: 5,352,635
[45] Date of Patent: Oct. 4, 1994

[54] SILICON ACCELEROMETER FABRICATION METHOD

[76] Inventors: Xiang-Zheng Tu; Yun-Yan Li, both of 14 Beihehutong Dongcheuggu, Beijing, China

[21] Appl. No.: 10,500

[22] Filed: Jan. 28, 1993

Related U.S. Application Data

[63] Continuation of Ser. No. 830,560, Jul. 12, 1991, abandoned.

[30] Foreign Application Priority Data

Jul. 12, 1990 [CN] China .................. 90103465.7

[51] Int. Cl.$^5$ .................................. H01L 21/465
[52] U.S. Cl. .................. 437/228; 73/517 R; 437/901; 257/254; 257/418
[58] Field of Search ............. 437/228, 901; 148/33.1, 148/33.2, 33.3; 257/417, 419; 73/517 R

[56] References Cited

U.S. PATENT DOCUMENTS

| | | | |
|---|---|---|---|
| 4,430,895 | 2/1984 | Colton | 73/517 R |
| 4,598,585 | 7/1986 | Boxenhorn | 73/517 R |
| 4,718,275 | 1/1988 | Norling et al. | 73/497 |
| 4,736,629 | 4/1988 | Cole | 73/517 |
| 4,766,768 | 8/1988 | Norling et al. | 73/497 |
| 4,805,456 | 2/1989 | Howe et al. | 73/517 |
| 4,893,509 | 1/1990 | MacIver et al. | 73/517 |
| 4,922,756 | 5/1990 | Henrion | 73/517 R |
| 4,945,765 | 8/1990 | Roszhart | 73/517 |
| 4,969,359 | 11/1990 | Mikkor | 73/517 |
| 4,981,552 | 1/1991 | Mikkor | 156/647 |
| 4,995,954 | 2/1991 | Guilinger et al. | 204/129.75 |
| 5,095,762 | 3/1992 | Holm-Kennedy et al. | 73/517 R |
| 5,121,633 | 6/1992 | Murakami et al. | 73/517 R |
| 5,242,863 | 9/1993 | Tu et al. | 437/228 |

OTHER PUBLICATIONS

Article: G. A. MacDonald, "A Review of Low Cost Accelerometers for Vehicle Dynamics," Sensors and Actuators, A21-A23 (1990) 303-307.

*Primary Examiner*—Olik Chaudhuri
*Assistant Examiner*—Ken Horton
*Attorney, Agent, or Firm*—Heslin & Rothenberg

[57] ABSTRACT

A silicon accelerometer comprising a substrate, one or more pairs of beams, a pedestal, a mass on top of the pedestal and a cavity beneath the pedestal all of which is formed by a single-sided processing method. The pedestal is suspended over the cavity by the beams which provides the only support for the pedestal. The beams are supported by the substrate. The main steps of fabricating this structure comprise diffusion or ion implantation and epitaxial growth to form a buried high donor concentration layer on the surface of the substrate, chemical vapor deposition and photoetching to expose a portion of the edge of the buried layer to the ambiente, anodization to convert the high donor concentration layer into porous silicon and selectively etching to remove the porous silicon.

19 Claims, 3 Drawing Sheets

SILICON ACCELEROMETER FABRICATION METHOD

This application is a continuation of application Ser. No. 07/830,560, filed Jul. 12, 1991, now abandoned.

FIELD OF THE INVENTION

The invention described below relates to a silicon-micromachine accelerometer particularly to a silicon beam accelerometer with a pedestal supported by the beams and a mass placed on top of the pedestal. It also includes a single side manufacturing process to fabricate the accelerometer.

BACKGROUND OF THE INVENTION

Silicon accelerometers have a wide variety of applications because of small size, low mass and low cost. The uses of accelerometers, in particular micro silicon based accelerometers, are many and varied and new applications will certainly be found as the manufacturing technology develops. In particular, the automotive industry is one of the biggest users of these devices. The increasing use of electronics systems in automobiles to replace existing systems based on mechanical devices will see substantial use of silicon based micro accelerometers in the automotive industry. At the present time, silicon based micro accelerometers are being used in suspension systems, braking systems, traction control systems, steering systems and safety systems.

Silicon accelerometers in their most useful configuration at present have two different forms. One form is a low resonant accelerometer having a resonator. In this form, two vibrating beams each support on one end respective masses. The two beams longitudinally lie on the same axis. Acceleration of the device causes opposite perturbations in the resonant frequencies of the beams, because inertial forces on the respective masses compress one beam and stretch the other. The output signal of the device is the frequency difference between the two beams. The resonator can be driven by electrical forces, thermal excitation, laser excitation or the like.

The other form is a piezoresistive accelerometer. In this form, a mass is suspended by two beams attached to opposite sides of the mass. When the system is accelerated, the beam-mounted mass will, on account of its inertia, at first lag behind the movement, one beam will thus be stretched and the other will be compressed which cause changes in the beams. The force acting on each beam is equal in magnitude and is equal to the product of the weight of the mass and the acceleration experienced by the mass. The output signal of the device is the resistance difference between the two beams.

Both kinds of accelerometers have silicon beams which are supported by a silicon substrate. Forming silicon beams is the key step in the fabrication of these accelerometers. A common method is to etch a hole upward from the bottom of a substrate, leaving thin silicon beams suspended over the hole. The whole structure is then eventually bonded to a base.

FIG. 1 shows a conventional silicon beam piezoresistive accelerometer. This accelerometer comprises a substrate 10, two beams 12 each of which has a P-type region 28 on the surface, a mass 16, a cavity 18, a base plate 46 and a cap 48. When the accelerometer is fabricated, the back side of the substrate is anisotropically etched using an etchant to form the beams and the cavity and the upper side is processed to form the resistors 28 and all other device elements. The double sided processing method has several problems to be solved. Among them are: a. Processing steps are very complicated because proper alignment of work done on bothside is required and difficult to achieve; b. etching of 400 microns thick silicon results in beam thickness variations of more then 3 microns which introduce substantial errors and create other problems; c. the dimension of the beam can not be made small because etching in the lateral direction results in poor dimension control.

These problems are obstacles to enhancement of measuring accuracy, minuaturization, mass production and reduction in cost.

SUMMARY OF THE INVENTION

Accordingly, it is an object of the invention described below to overcome the above-described problems and to provide a high performance, low cost silicon accelerometer. The accelerometer generally contains a strain gauge on the silicon beam portion of the accelerometer. The strain gauge can be and often is a piezoresistive based one. The manufacturing technique described below is based on standard silicon integrated circuit fabrication technology. Consequently, miniaturization and mass production of efficient and accurate accelerometers can be achieved while at the same time allowing the inclusion of microcircuitry.

The present invention as depicted in FIGS. 2A, 2B and 3I provides for a silicon accelerometer which is composed of a substrate, with one or more pairs of beams, a pedestal having a mass mounted at the top and a cavity located below the pedestal.

The pedestal is supported by at least one pair of beams. One end of one beam is attached to one side of the pedestal and one end of the second beam is attached to the opposite side of the pedestal. The opposite end of the respective beams are attached to the substrate. The two beams are longitudinally aligned with each other to form an axis which runs through the pedestal on which the mass rests. The cavity is buried within the bulk of the substrate. The top of the cavity is the pedestal. A small gap separates the bottom of the pedestal from the bottom of the cavity. Around the edge of the cavity there are one or more openings which separate the sides of the cavity from the edge of the pedestal. The beams are suspended over the openings and connect the pedestal to the substrate. The beam being the only structure which provides support to the pedestal.

On each of the beams a strain gauge, generally a piezoresistive device, is located. The strain gauges or piezoresistive elements detect movement whenever the whole accelerometer is either subjected to an accelerating or decelerating force. Since the pedestal and the mass on top of it is only connected to the surrounding substrate by the beams and is suspended over the cavity, movement is detected due to inertial forces acting on the mass and the pedestal which is detected in the beams which contain the strain gauges or piezoresistive elements. Additionally, circuitry and other microdevices can be added to amplify and transmit the readings given off by the strain gauges or piezoresistive elements.

According to the present invention, the processing steps of the silicon accelerometer comprise: forming a high donor concentration layer in a predetermined region on the surface of a low donor concentration substrate by diffusion or ion implantation; growing a low donor concentration layer over the surface of the substrate by chemical vapor epitaxy or like process; exposing a portion of the edge of the high donor concentration layer to the ambiente through several openings formed by photoetching; converting the buried high donor concentration layer into porous silicon by anodization of silicon in a hydrofluoric acid solution; mounting a mass onto a predetermined pedestal region; and removing the porous silicon by etching.

In comparison with conventional fabricating processes of silicon accelerometers, the present invention has the following advantages:

a. All processing steps are conducted solely at the upper side of the substrate which facilitates the realization of an integrated accelerometer;
b. Since the anodization of silicon and the etching of porous silicon can stop automatically, it is possible to make the thickness and size of the beams, and pedestal adequately small and accurate.
c. Only a little amount of silicon is removed from the substrate to form the cavity which favors the enhancement of reliability and robustness of the accelerometer;
d. The wall and bottom of the cavity can function as a mechanical overstop which prevents over-force damage both in the vertical and horizontal directions of the substrate.

Since the whole process is based on standard integrated circuit technology, it is obvious that additional micro circuit components can be added for various applications including signal processing purposes transmission of the signal to other devices for reading or the like.

BRIEF DESCRIPTION OF THE DRAWINGS

FIG. 2 is a schematic view of an embodiment of a silicon beam piezoresistive accelerometer of the present invention.

FIG. 3A through 3D and FIG. 3H through 3I are cross sectional views along line B—B of FIG. 2A and FIG. 3E through 3G are cross sectional view along line A—A of FIG. 2A.

DETAILED DESCRIPTION OF A PREFERRED EMBODIMENT

Figure 1:
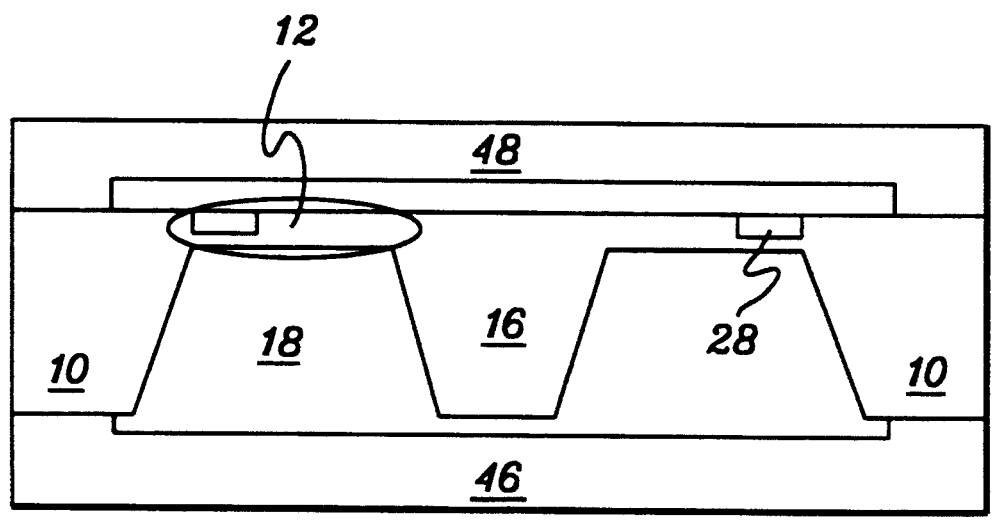
FIG. 1 is a cross sectional view of a conventional silicon beam piezoresistive accelerometer.
Figure 2A:
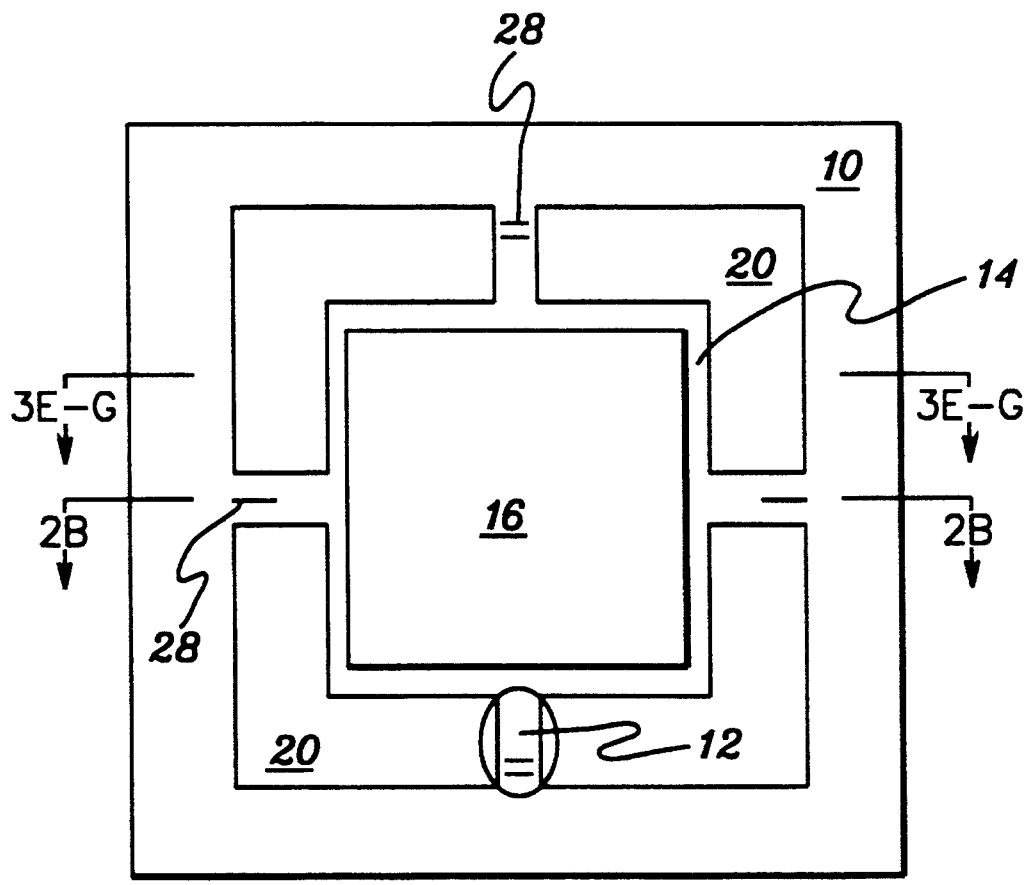
FIG. 2A is the top view and FIG. 2B is the sectional view on B—B line of the FIG. 2A.
Figure 2B:
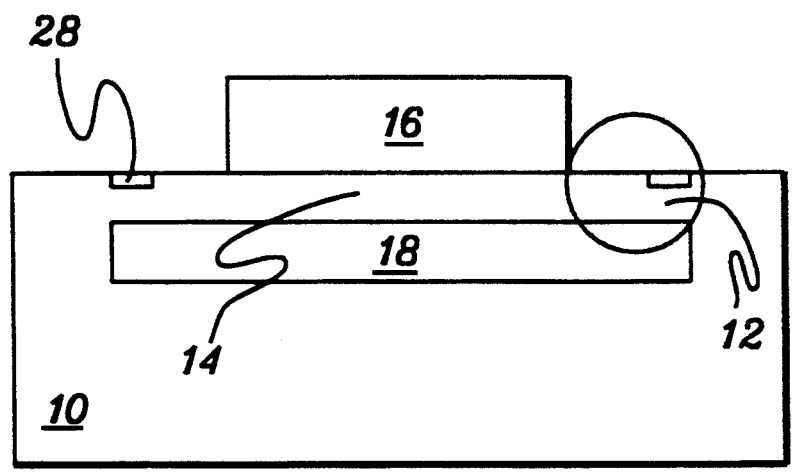
Figure 3A:
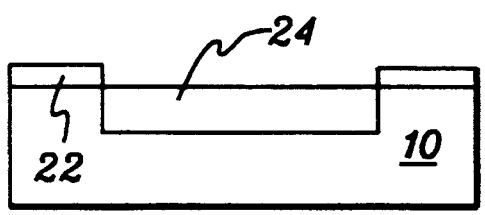
FIG. 3A through 3I are sectional views showing sequential steps of a fabricating process of an embodiment of the present invention.
Figure 3F:
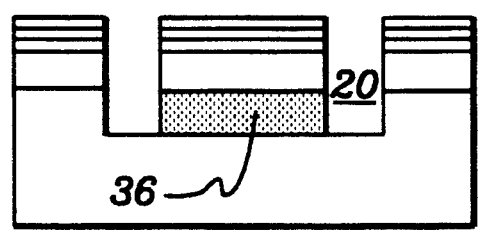
Figure 3B:
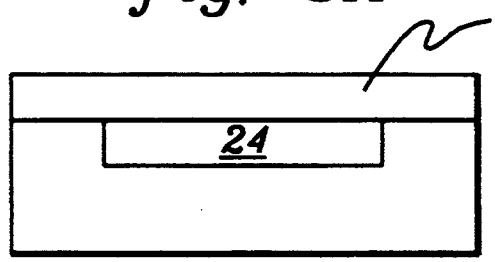
Figure 3G:
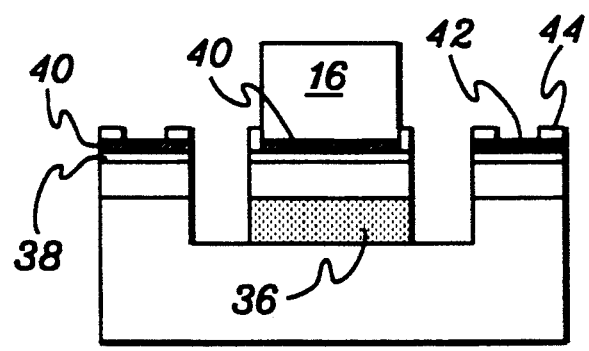
Figure 3C:
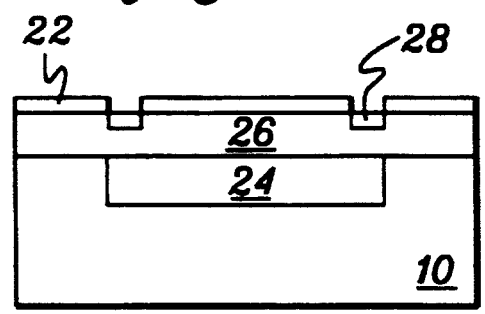
Figure 3D:
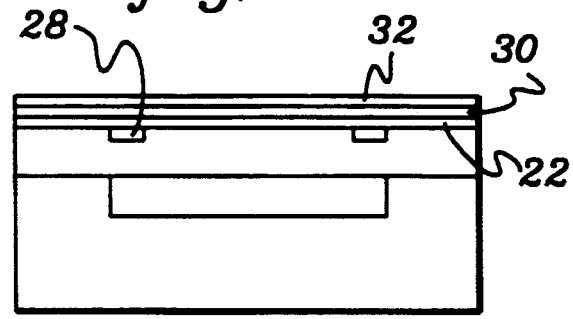
Figure 3H:
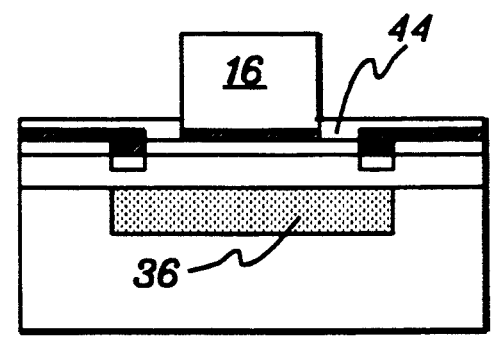
Figure 3E:
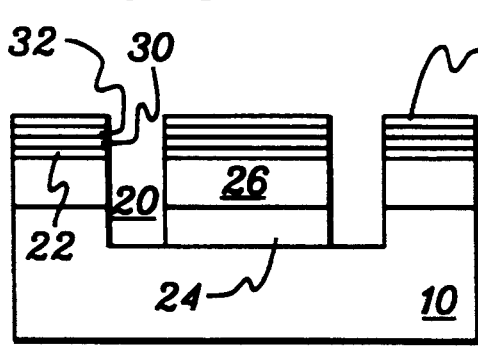
Figure 3I:
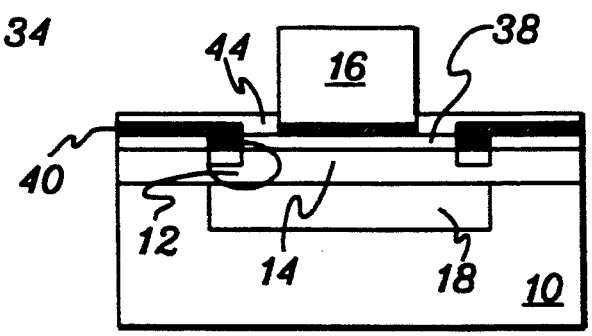

An example of the preferred embodiment of the present invention in its final form is shown in FIG. 2A and 2B and FIG. 3I. The accelerometer shown in the above referenced figure is in chip form. Referring to FIGS. 2A, 2B and 3I, the silicon accelerometer is composed of a substrate 10, one or more pairs of beams 12, a pedestal 14 having a mass 16 mounted at the top and a cavity 18, located directly beneath the pedestal.

The mass 16 and pedestal 14 are supported by the beams 12. One end of each beam is attached to one side of the pedestal 14 the opposite end of each beam 12 is attached to the substrate 10. The beams are on opposite sides of the pedestal and are longitudinally aligned with each other to form an axis which runs through the pedestal 14.

The cavity 18 is buried within the bulk of the substrate 10. The top of the cavity is formed by the pedestal 14. The space in the cavity 18 separates the pedestal 14 and the mass 16 on top of the pedestal from the bottom of the cavity 18. There are one or more openings 20 which separate the sides of the pedestal 14 from the substrate 10. The beams 12 are suspended from the substrate 10 over the openings 20 and connect to the pedestal 14 and provide the only means of support for the pedestal 14 and the mass 16 located on top of the pedestal.

Each beam has on it a means for detecting motion. This means is generally a type of strain gauge. In the preferred embodiment each beam has one or more P-type regions on the surface which is designed to form piezoresistive element 28. In the preferred embodiment the resistor elements are interconnected by a patterned gold layer 40 and connected to a circuit board through metal wires which are bonded onto the pads 42. In the preferred embodiment the chip is generally 1400 microns $\times$ 1400 microns $\times$ 400 microns in size.

One preferred form of the accelerometer in accordance with this embodiment comprises: a (100) N-type silicon substrate 10 having a carrier concentration of $3\times 10^{15}$ cm$^{-3}$; two pairs of opposite beams 12 having a size of 200 microns $\times$ 80 microns $\times$ 2 microns each and aligned with one of the <110> direction in the (100) silicon substrate each; four resistors each of which is disposed at a predetermined position on the surface and aligned with one of the <110> direction in the (100) silicon substrate; a pedestal 14 having a size of 600 microns $\times$ 600 microns $\times$ 2 microns; a mass 16 made of silicon which is mounted onto the pedestal by bonding; and a cavity 18 having a size of 600 microns $\times$ 600 microns $\times$ 4 microns which is situated below the mass pedestal.

The accelerometer depicted in FIGS. 2 and 3 is fabricated in the following manner:

At the step shown in FIG. 3A, a (100) N-type silicon substrate 10 having a carrier concentration of $3\times 10^{15}$ cm$^{-3}$ is thermally oxidized to form a silicon dioxide layer 22 having a thickness of 1.2 microns. The silicon dioxide 22 layer is patterned by photoetching to define a region on the surface of the substrate for arsenic diffusion. Arsenic diffusion is performed to form a high donor concentration layer 24 having a junction depth of about 5 microns in the defined region.

At the step shown in FIG. 3B, after removing the silicon dioxide layer on the surface of the substrate, a low donor concentration layer 26 is formed over the surface of the substrate by vapor phase epitaxy. The low donor concentration layer 26 has a concentration of $3\times 10^{15}$ cm$^{-3}$ and a thickness of about 2.5 microns.

At the step shown in FIG. 3C, the substrate is thermally oxidized to form a silicon dioxide layer 22 having a thickness of 2000 Angstroms on the surface of the substrate. Then a pattern is formed by photoetching to reveal six regions at predetermined positions for boron ion implantation. Boron ion implantation is performed to form a P-type layer 28 having surface carrier concentration of about $2\times 10^{18}$ cm$^{-2}$ and a sheet resistance of 500 ohms/square.

At the step shown in FIG. 3D, a silicon nitride layer 30 and high resistance polysilicon layer 32 are formed over the surface of the silicon dioxide layer 22 by chemical vapor deposition. The thickness of these two layers are 1500 Angstroms and 5000 Angstroms respectively.

At the step shown in FIG. 3E, an aluminum layer 34 is formed by vacuum evaporation on the surface of the composite layer. Then a pattern is formed in the aluminum layer by photoetching. Plasma etching is performed to remove the high resistance polysilicon layer 32, silicon nitride layer 30 and silicon dioxide layer 22 in the revealed regions exposed by the patterned aluminum layer to form openings 20 which penetrate the low donor concentration layer 26 and reach the buried high donor concentration layer 24.

At the step shown in FIG. 3F, the patterned aluminum layer 34 is removed by etching. Then anodization is carried out to convert the buried high donor concentration layer 24 into porous silicon 36. In the preferred embodiment anodic voltage of 4 volt with a concentrated hydrofluoric acid solution of 30 w% is very effective.

In the preferred embodiment the anodization is performed in a teflon electrochemical cell. The cell is filled with hydrofluoric acid solution. The substrate to be anodized is placed vertically into the cell in the middle of the cell and separates the cell into two parts. Each part of the cell has a platinum electrode facing a surface of the substrate. The back side of the substrate faces the anodic electrode and the front side faces the cathode electrode.

The interface between the substrate and the solution has a rectifying nature such as it allows current to flow in one direction and acts as a barrier for current flowing in the opposite direction. Thus at an appropriate anodic voltage the anodic current can enter the buried low resistance layer but not the high resistance regions. After all the low resistance silicon converts into porous silicon, the anodization can stop automatically.

In the preferred process at the step show in FIG. 3G after removing the high resistance polysilicon layer, a borosilicate glass layer 38 having a thickness of 2000 Angstroms is formed over the surface of the substrate by chemical vapor deposition. Contact holes are formed in the borosilicate glass layer by photoetching. A gold layer 40 having a thickness of 1 micron is formed over the surface of the substrate. Interconnection between the P-type regions (resistors) are formed in the gold layer 40 by photoetching. A phospho-silicate glass layer 44, as a protective layer, is formed over the surface of the substrate by chemical vapor deposition. A pattern is formed in the phospho-silicate glass layer 44 by photoetching to reveal the gold layer for bonding pads 42.

In the preferred embodiment at the step shown in FIG. 3H, a silicon mass 16, having a 20–30 microns thick electroplated gold layer on the lower side, is mounted by a bonding technique over the pad area where the porous silicon layer is buried, on top of the pedestal.

At the step shown in FIG. 3I the porous silicon 36 is removed by etching in a diluted alkaline solution which can be among others ammonia hydroxide solution having in the preferred embodiment a concentration of 1 w% to 10 w%.

According to the present invention, in the preferred embodiment the low donor concentration layers have a concentration between $10^{15}$ and $10^{16}$ cm$^{-3}$. The high donor concentration layer in the preferred embodiment has a concentration profile ranging from $10^{17}$ to $10^{21}$ cm$^{-3}$.

Since a part of the low donor concentration layer 26 formed by epitaxial growth is designed to be the beams 12 and the mass pedestal 14, the thickness of the high resistance layer takes the value of a predetermined thickness of the beams and the pedestal.

According to the present invention, a hydrofluoric-acid-resisting and electrically insulating layer is used as a mask in the anodization in a hydrofluoric acid solution. This layer in the preferred embodiment is a composite layer consisting of silicon dioxide 22, silicon nitride 30 and high resistance polysilicon 32. The composite layer is formed by low pressure chemical vapor deposition.

According to the present invention, the openings 20 are formed by plasma etching. A preferred etching mask is a patterned metal layer such as an aluminum layer 34 or the like.

According to the present invention, in the preferred embodiment the anodization is performed in a teflon electrochemical cell. The cell is filled with hydrofluoric acid solution and separated into two parts by a substrate to be anodized. Each part has a platinum plate as a electrode. The back side of the substrate faces the anodic electrode and the front side of the substrate faces the cathode electrode. The anodic voltage is kept at a constant value during the anodization. The reason for converting the high donor concentration layer into porous silicon can be explained as follows:

The interface between a N-type silicon and a hydrofluoric acid solution has a rectifying nature. A high donor concentration silicon has a low breakdown voltage. When an appropriate anodic voltage is applied to the substrate, the anodic current can enter the high donor concentration regions but not the low donor concentration layer. As a result, the high donor concentration silicon converts into porous silicon but the low donor concentration silicon remains unchanged.

According to the present invention, in the preferred embodiment the used concentration of hydrofluoric acid solution ranges between 10 w% and 50 w%. The used anodic voltage ranges between 4 and 7 volt. The anodic reaction can stop automatically after high donor concentration silicon converting into porous silicon.

According to the present invention, the mass 44 may be made of silicon, heavy metal or the like and it is mounted onto the surface of the mass pedestal 14 by bonding or deposition followed by photoetching.

According to the present invention, the porous silicon 36 is etched by a diluted alkaline solution such as a potassium hydroxide solution, sodium hydroxide solution, ammonia hydroxide solution or the like. The used concentration of the alkaline solution is chosen between 1 w% and 5 w%. An alkaline solution having such low concentration does not significantly affect silicon at room temperature, so etching process can stop automatically after all porous silicon has been removed.

Although the preferred embodiment uses piezoresistive elements to detect motion, this accelerometer described above with proper modification can also employ the resonant method of detecting motion. Such a method would use a resonator which can be excited to resonate by a driving force such as electrical forces, thermal excitation, laser excitation and so on.

The above described manufacturing process can also be used to manufacture the resonator based form of the accelerometer.

The accelerometer fabricating process of the present invention is compatible with a standard integrated circuit technology. Therefore it is very easy to form integrated circuit components for processing the output signal of the accelerometer in the same chip or to transmit the signal to the outside.

What is claimed:

1. A process for fabricating a silicon accelerometer comprising the steps of:

providing a low donor concentration silicon substrate, forming a high donor concentration silicon layer in a predetermined region on the surface of the substrate by diffusion or ion implantation, forming a low donor concentration silicon layer over the surface of said substrate by vapor phase epitaxy, forming at least one opening in said low donor concentration layer thereby exposing edges of said high donor concentration layer, after said forming at least one opening, converting said high donor concentration layer into porous silicon by anodization, said converting of said high donor concentration layer being bounded by said exposed edges of said high donor concentration layer, mounting a mass onto the low donor concentration layer, removing the porous silicon by etching between the substrate and the low donor concentration layer to form a cavity between the substrate and the low donor concentration layer, said etching resulting in a complete removal of the porous silicon.

2. An accelerometer fabrication process according to claim 1 wherein said low donor concentration layer has a concentration between $10^{15}$ and $10^{16}$ cm$^{-3}$.

3. An accelerometer fabrication process according to claim 1 wherein said high donor concentration layer has a concentration profile ranging between $10^{17}$ and $10^{21}$ cm$^{-3}$.

4. An accelerometer fabrication process according to claim 1 wherein said anodization is carried out in a hydrofluoric acid solution.

5. An accelerometer fabrication process according to claim 4 wherein hydrofluoric acid solution has a concentration between 10 w% and 50 w%.

6. An accelerometer fabrication process according to claim 1 wherein said anodization is carried out at a constant voltage between 3 and 10 volt.

7. An accelerometer fabrication process according to claim 4 wherein said etching of porous silicon is performed in a diluted alkaline solution.

8. An accelerometer fabrication process according to claim 7 wherein said alkaline solution is ammonia hydroxide solution.

9. An accelerometer fabrication process according to claim 8 wherein said ammonia hydroxide solution has a concentration between 1 w% and 10 w%.

10. An accelerometer fabrication process according to claim 9, wherein said alkaline solution is sodium hydroxide solution.

11. An accelerometer fabrication process according to claim 10 wherein said sodium hydroxide solution has a concentration between 1 w% and 10 w%.

12. An accelerometer fabrication process according to claim 7 wherein said alkaline solution is potassium hydroxide solution.

13. An accelerometer fabrication process according to claim 7 wherein said potassium hydroxide solution has a concentration between 1 w% and 10 w%.

14. An accelerometer fabrication process according to claim 7 wherein said alkaline solution is caesium hydroxide solution.

15. An accelerometer fabrication process according to claim 14 wherein said caesium hydroxide solution has a concentration between 1 w% and 10 w%. and more particularly, 16. The accelerometer fabrication process of claim 4 further comprising the step of forming a hydrofluoric-acid resisting and electrically insulating layer on the low donor concentration layer to serve as a mask in the anodization step.

17. The acceleration fabrication process of claim 16 wherein said hydrofluoric-acid resisting and electrically insulating layer comprises a composite layer consisting of silicon dioxide, silicon nitride, and high resistance polysilicon.

18. The accelerator fabrication process of claim 17 wherein said composite layer is formed by low pressure chemical vapor deposition.

19. The accelerometer fabrication process of claim 1 wherein said at least one opening is formed by plasma etching utilizing a patterned metal layer as an etching mask.

* * * * *